Patented Dec. 29, 1936

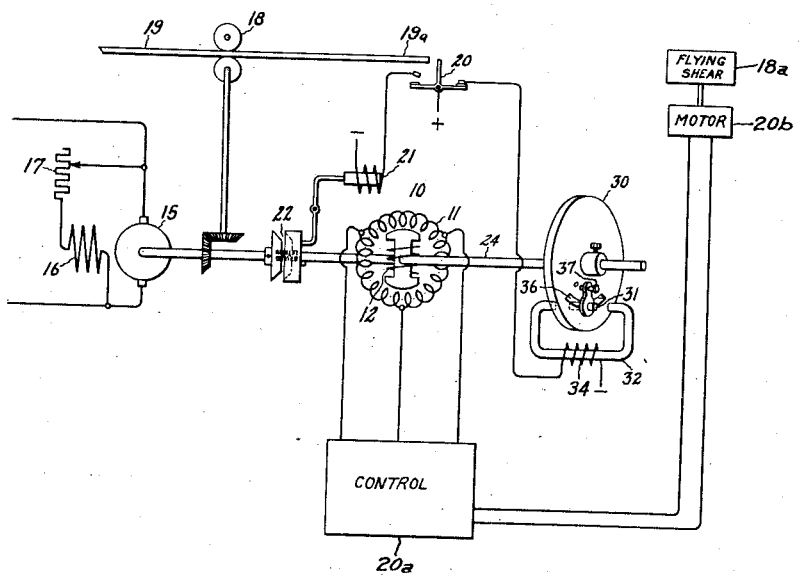
Inventor:
Stewart H. White,
by Harry E. Dunham
His Attorney.

2,066,131

UNITED STATES PATENT OFFICE 2,066,131

ELECTRIC BRAKE

Stewart H. White, Port Angeles, Wash., assignor to General Electric Company, a corporation of New York Application June 8, 1933, Serial No. 674,890

3 Claims. (Cl. 188—104)

My invention relates to electric brakes, more particularly to electric braking means for bringing a rotating device to rest in a predetermined angular position, and has for its object a simple and reliable device of that character.

Though not limited thereto, my invention is particularly applicable to systems of control of the type described and claimed in copending application, Serial No. 674,894, filed June 8, 1933, Rhea and Umansky, entitled Control systems, now Patent No. 2,023,243 dated December 3, 1935. In this application a flying shear is driven continuously and means are provided whereby the blades of the shear will occupy a definite angular position when the front end of a bar of metal arrives at a definite position in its travel. Inasmuch as the shear is driven continuously it will be understood that if a predetermined relationship between the angular position of the blades of the shear and the front end of the bar of metal is to be established at a given time, an indication must be obtained in the event that such relationship does not exist, and a corrective operation must be initiated in accordance with this indication to establish said relationship.

In the system of the aforesaid Rhea and Umansky application this predetermined relationship between the angular position of the shear and the bar of metal is obtained through the agency of a member which is driven with the bar but which is started from a predetermined angular position with each bar. My invention has particular application to means for stopping this driven member in a predetermined angular position preparatory to the cutting of each bar. In carrying out my invention in one form I provide magnetic means for dynamically braking the driven member and for bringing it to rest in a predetermined angular position.

For a more complete understanding of my invention reference should be had to the accompanying drawing wherein I have shown diagrammatically my invention applied to a control system.

Referring to the drawing I have shown my invention in one form as applied to a position determining device 10 provided with a poly-circuit stationary winding 11 and a single circuit rotor winding 12 energized from a suitable alternating current source of supply. A motor 15 provided with a field winding 16 and a field rheostat 17 is arranged to drive a finishing stand 18. When the bar of metal 19 leaves the finishing stand 18 its leading end 19a is arranged to engage a flag switch 20 to close the circuit of the operating coil 21 of a magnetically operated clutch 22. This circuit is maintained so long as the bar of metal engages the flag switch 20. Upon the energization of the operating coil 21, the clutch 22 is operated to connect the position determining device 10 to the driving motor 15. The position from which the rotor winding 12 is accelerated is determined with reference to the position that the blades of a flying shear 18a should occupy when the leading end 19a of the bar 19 arrives at the position occupied by the flag switch 20.

As described in the application of Rhea and Umansky, referred to above, a differential position determining device located in the control box 20a compares the position of a position determining device (not shown), of the same construction and energized from the same source of supply as the device 10, driven by the motor 20b with the position that the rotor winding of the device 10 occupies. The control 20a in response to the operation of the differential device accelerates or decelerates the motor 20b until the positions of the two devices correspond.

When the two devices are in positional agreement, the blades of the flying shear occupy the predetermined position which will cause a predetermined length to be cut from the front end of the bar of metal after which the shear cuts the remainder of the bar into the same predetermined lengths.

As soon as the trailing end of the bar leaves the flag switch 20, the switch automatically returns to its original position to deenergize the clutch operating coil 21 and to energize the coil 34 of a U-shaped magnet 32. The rotor winding 12 and its shaft 24 continue to rotate, however, due to the inertia of the parts and the friction of the clutch. The rotor winding 12 is brought to a standstill in a definite angular position by means of a non-magnetic disk 30 secured to the shaft and provided with a magnetic insert 31. The U-shaped magnet 32 provided with its energizing coil 34 is associated with the copper or aluminum disk so as to produce a strong magnetic flux across the disk 30 and in line with the insert 31. The action of this flux and the rotation of the metal disk produces a dynamic braking effect and slows down the disk and its shaft 24. As soon as the speed of the disk 30 decreases a predetermined amount, the attractive effort exerted on the iron insert 31 by the magnet 32 is sufficient to bring the disk 30 and the winding 12 to a standstill with the iron insert 31 occupying a position between the poles of the magnet 32. It will, therefore, be observed that after each operation the position determining device 10 always occupies a definite angular position determined by the relationship between the magnet and the iron insert. It will further be observed that the rotor winding 12 of the position determining device is always accelerated from this definite position. The angular position can be varied by moving the insert 31 in a slot 36 provided in the disk 30, an adjusting screw 37 normally securing the insert 31 in place. If desired, additional adjustments can be secured by mounting the magnet 32 so that it can be moved circumferentially with respect to the disk 30.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. An electric brake comprising a rotatably mounted disk made of nonmagnetic material, a member made of magnetic material secured to said disk, and an electromagnet provided with pole pieces on opposite sides of said disk for producing a flux across said disk to brake dynamically said disk and stop said disk in a predetermined angular position by the attractive effort produced by said flux on said member.

2. An electric brake comprising a rotatably mounted disk made of nonmagnetic electrically conducting material, a member made of magnetic material carried by said disk, and a stationary magnet provided with pole pieces on opposite sides of said disk for producing a magnetic flux across said disk in line with said member to thereby brake dynamically said disk and stop said disk with said magnetic member in alinement with said magnet.

3. An electric braking device comprising a disk of nonmagnetic material mounted for rotation, said disk being provided with an arcuate slot, a member made of magnetic material, means for adjustably mounting said member in said slot, and an electromagnet provided with pole pieces on opposite sides of said disk for producing a magnetic flux across said disk in line with said member to brake dynamically said disk and to stop said disk with said member between said pole pieces.

STEWART H. WHITE.